Figure 3:
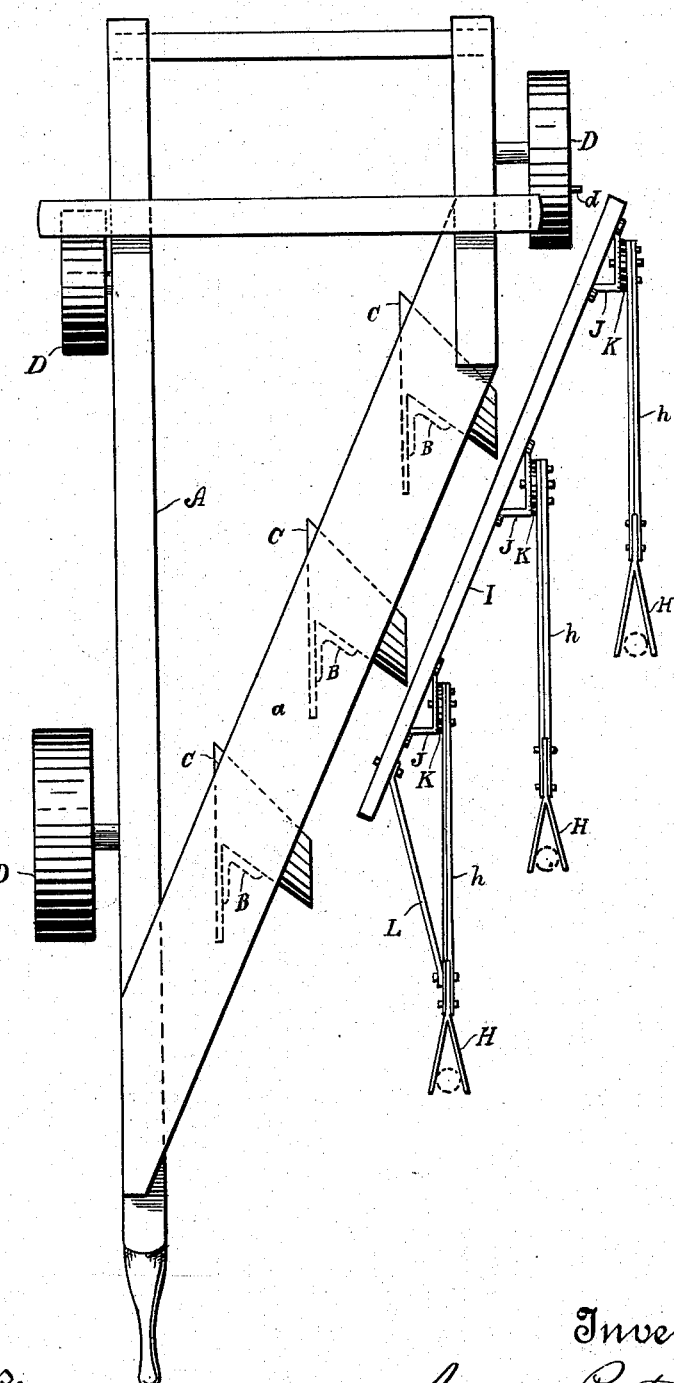

(No Model.) 2 Sheets—Sheet 1.
J. PORTEOUS.
COMBINED PLOW AND SEEDER.
No. 568,100. Patented Sept. 22, 1896.
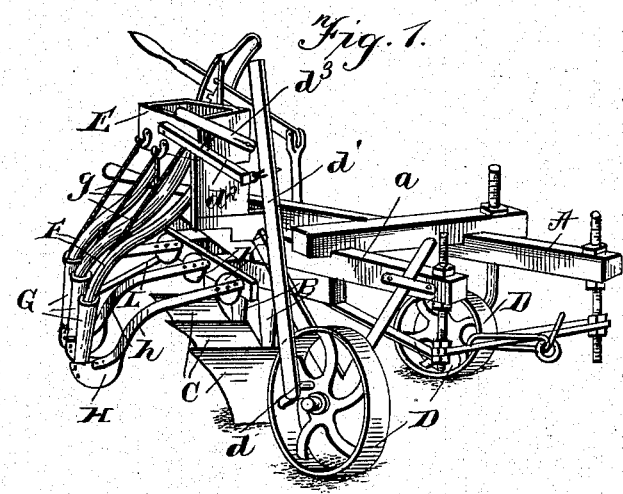
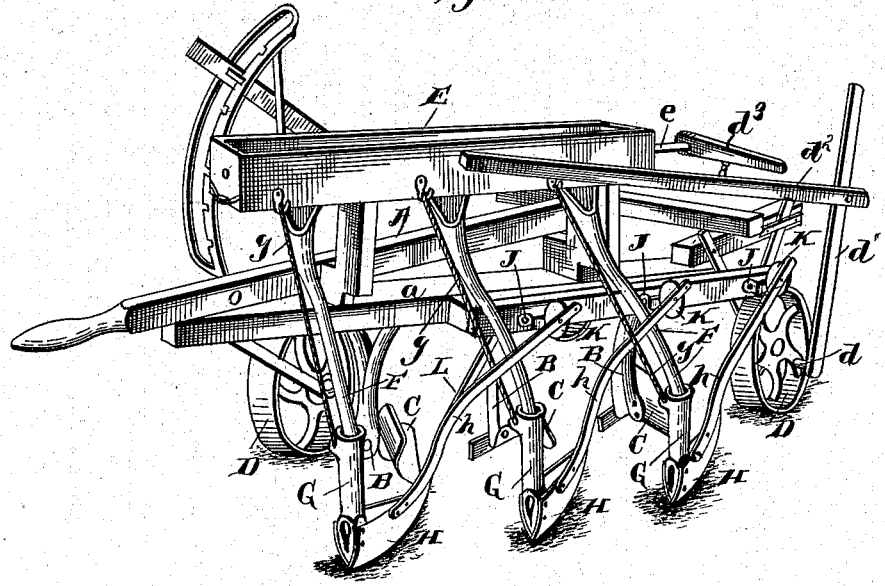
Witnesses
Geo. E. Frech.
R. Williams
Inventor
James Porteous
by Dewey & Co.
his Attorneys (No Model.) 2 Sheets—Sheet 2.

J. PORTEOUS.
COMBINED PLOW AND SEEDER.

No. 568,100. Patented Sept. 22, 1896.

Witnesses,

Inventor,
James Porteous
By Dewey & Co
Attys

UNITED STATES PATENT OFFICE.

JAMES PORTEOUS, OF FRESNO, CALIFORNIA.

COMBINED PLOW AND SEEDER.

SPECIFICATION forming part of Letters Patent No. 568,100, dated September 22, 1896.

Application filed June 4, 1896. Serial No. 594,217. (No model.)

*To all whom it may concern:*

Be it known that I, JAMES PORTEOUS, a citizen of the United States, residing at Fresno, county of Fresno, State of California, have invented an Improvement in a Combined Plow and Seeder; and I hereby declare the following to be a full, clear, and exact description of the same.

My invention relates to that class of agricultural implements in which the parts and functions of a gang-plow and a seeding-machine are combined.

In gang-plows of all kinds the plow-bottoms are arranged, whether on a single beam or on multiple beams, so that a line drawn through the series of plow-bottoms is inclined to the line of draft, whereby the plow-bottoms turn different parallel furrows. This arrangement is realized in such plows as the steel-beam gangs, by reason of making the beams of different lengths, and in such plows as the "bench-beam plow" and others having right-angled triangle frames the result is reached by carrying the plows from the hypotenuse or inclined beam side of the frame. Heretofore in combining seeders with gang-plows a seedbox was mounted on the frame and was provided with interior agitators driven by suitable mechanism, and said box was also provided with delivery-chutes by which the seed was discharged and delivered broadcast over the side of the frame. The disadvantage, due to imperfect covering and birds, of this broadcast delivery has been long noted, and attempts have been made to combine with the plow a drill-seeder, but these have resulted in too great complications, arising from what may be termed the "want of intimacy" between the machines, due to the fact that the drill-machine has remained distinct, even to the extent of being supported upon its own wheels, or, at best, one of its wheels, thus carrying out the idea of attaching a following seeder to a plow.

It is the object of my invention to simplify the combination by an intimate union of the parts performing the two general functions providing a distinctly single implement, and one which employs drills arranged to the best advantage for simplicity in construction and effectiveness in operation.

My invention consists in a plow-frame having its plow-bottoms arranged in a line inclined to the line of draft, a seedbox supported on said frame and provided with suitable discharging mechanism, drill-shoes arranged in line parallel with the line of the plows, flexible conveyers from the seedbox to said shoes, and colters or shares of said shoes, the arms of which extend up to and are pivotally connected with the plow-frame.

It also consists in the novel constructions, arrangements, and combinations which I shall hereinafter fully describe by reference to the accompanying drawings, in which—

Figure 1 is a perspective view of my combined plow and seeder, looking at it from the front. Fig. 2 is a side perspective. Fig. 3 is a plan, the seedbox, drill-shoes, and flexible connections being omitted.

Though my invention is not confined to any particular form of gang-plow, I have, for the sake of illustration, shown the plow-frame as one of the right-angled triangle kind.

A is the plow-frame, having the inclined side $a$ forming the beam, to which are secured the standards B of the plow-bottoms C, which are in a line inclined to the line of draft or travel of the frame. The frame is carried on the wheels D.

Supported on frame A is the seedbox E, which may be supposed to be provided with suitable discharging mechanism, such as agitators, to be operated by the oscillation of shaft $e$, which is itself rocked by suitable mechanism from one of the wheels. The crank $d$ on said wheel, connected levers $d'\ d^2$, and crank-levers $d^3$ may serve to illustrate such mechanism.

F are the flexible conveyers communicating above with the seedbox-discharges and below with the shoe-drills G, which said shoes have colters or shares H, the arms $h$ of which extend up to and have a pivotal connection with the beam $a$, either directly or through the intervention of a separate bar I, bolted to the side of the beam. The pivotal connection of these arms is best formed by means of brackets J, to which are pivoted disks K, having the arms bolted to them. Each drill may thus yield and rise to obstructions and accommodate itself to the inequalities met with in its travel. Each is held out to its line parallel with the line of the plow-bottoms by the colter-arms, and is properly suspended by a line or chain *g* from the seedbox above. They lie and travel in lines parallel to the line of the plow-bottoms, and as the latter line is inclined to the path of travel it follows that the drills lie in different lines corresponding to the furrows previously made by the plow-bottoms, so that they are adapted to accurately deposit the seed in the proper rows. By this arrangement of the drills they are separated from each other by a distance greater than could be had if they were side by side, as is the case where a more or less distinct seed-drill is connected with and made to follow the plow, and therefore there is no chance to choke up with weeds or clods, resulting from the fact that the ground is simply plowed and not harrowed or rolled.

The machine is practically a single implement, light of draft, with no tendency to side draft and no wheel on the plowed ground.

The implement in turning moves around on the rear wheel as a center. Now, as the rearmost drill is slightly back of this wheel, it follows that in turning to the left, as is the practice, said drill will describe an arc which will carry it out a little into the plowed ground. This brings a strain upon it which I have found it best to resist by means of a brace L, bolted to the colter-arm and to the bar I. The others do not need bracing.

Having thus described my invention, what I claim as new, and desire to secure by Letters Patent, is—

1. A combined plow and seeder consisting of a frame having plow-bottoms arranged in a line inclined to the line of draft or travel of said frame, a seedbox supported on said frame and provided with suitable discharges, and drills following the plows and communicating with said seedbox and arranged in a line parallel with the line of plow-bottoms.

2. A combined plow and seeder consisting of a frame having an inclined side and having plow-bottoms arranged in a line inclined to the line of draft or travel of said frame, a seedbox supported on said frame and provided with suitable discharges, drill-shoes along said inclined side of the frame and arranged in line and parallel with the line of plow-bottoms, flexible conveyers from the seedbox to said shoes, and pivoted connections for controlling said shoes.

3. A combined plow and seeder consisting of a frame having plow-bottoms arranged in a line inclined to the line of draft or travel of said frame, a seedbox supported on said frame and provided with suitable discharges, drill-shoes arranged in line and parallel with the line of plow-bottoms, flexible conveyers from the seedbox to said shoes, and colters or shares of said shoes, having arms pivotally connected with the frame whereby they automatically rise and fall about their pivotal connection.

4. A combined plow and seeder consisting of a frame having plow-bottoms arranged in a line inclined to the line of draft or travel of said frame, a seedbox supported on said frame and provided with suitable discharges, drill-shoes arranged in line and parallel with the line of plow-bottoms, flexible conveyers from the seedbox to said shoes, and colters or shares of said shoes, having arms pivotally connected with the frame by means of the brackets and pivoted disks.

5. A combined plow and seeder, consisting of a frame having plow-bottoms arranged in a line inclined to the line of travel or draft of said frame, a seedbox supported on said frame and provided with suitable discharges, drill-shoes arranged in line and parallel with the line of said plow-bottoms, flexible conveyers from the seedbox to said shoes, colters or shares of said shoes having arms, a separate bar secured to the plow-frame and having brackets secured to it, and the disks bolted to the ends of the colter-arms and pivoted to the brackets.

6. A combined plow and seeder consisting of a wheeled frame with plow-bottoms arranged in a line inclined to the line of travel or draft of said frame, a seedbox supported on said frame and having suitable discharges, drill-shoes arranged in line and parallel with the line of the plow-bottoms, flexible conveyers from said seedbox to the shoes, colters or shares of said shoes pivotally connected with the frame, and a brace from the frame to that colter-arm lying back of the plane of the pivot-wheel, to resist the strain thereon in turning, substantially as described.

In witness whereof I have hereunto set my hand.

JAMES PORTEOUS.

Witnesses:
S. H. NOURSE,
JESSIE C. BRODIE.